United States Patent [19]

Yamada

[11] Patent Number: 4,778,138
[45] Date of Patent: Oct. 18, 1988

[54] APPARATUS FOR ADJUSTING HEIGHT OF SEAT FOR AUTOMOBILE

[75] Inventor: Yukifumi Yamada, Toyota, Japan

[73] Assignee: Aisin Seiki Kabushiki Kaisha, Kariya, Japan

[21] Appl. No.: 912,502

[22] Filed: Sep. 29, 1986

[30] Foreign Application Priority Data

Sep. 30, 1985 [JP] Japan .............................. 60-216983

[51] Int. Cl.⁴ ............................................ F16M 13/00
[52] U.S. Cl. .................... 248/421; 192/8 C
[58] Field of Search .............. 248/421, 423, 422, 157; 267/155, 131; 192/8 C

[56] References Cited

U.S. PATENT DOCUMENTS

| | | | |
|---|---|---|---|
| 4,422,611 | 12/1983 | Kitsuda | 248/421 |
| 4,529,159 | 7/1985 | Terada et al. | 248/421 |
| 4,566,667 | 1/1986 | Yanagisawa | 248/421 X |
| 4,573,657 | 3/1986 | Sakamoto | 248/421 X |
| 4,614,257 | 9/1986 | Harada et al. | 192/8 C |
| 4,651,854 | 3/1987 | Harada | 192/8 C |

Primary Examiner—Ramon O. Ramirez
Attorney, Agent, or Firm—Finnegan, Henderson, Farabow, Garrett and Dunner

[57] ABSTRACT

An apparatus for adjusting the height of a seat for an automobile has a handle disposed on a seat adjuster, a spring coupler operatively connected to the handle, a link operatively connected to the handle through the spring coupler, and a rod for connecting the link to a link disposed on the other side. A balance spring is incorporated in the spring coupler, one end of the spring being retained by a casing, and the other end of the spring being retained by a driven member. Accordingly, the balance spring is advantageously suitable for balancing the seat within the seat height adjustable range.

11 Claims, 4 Drawing Sheets

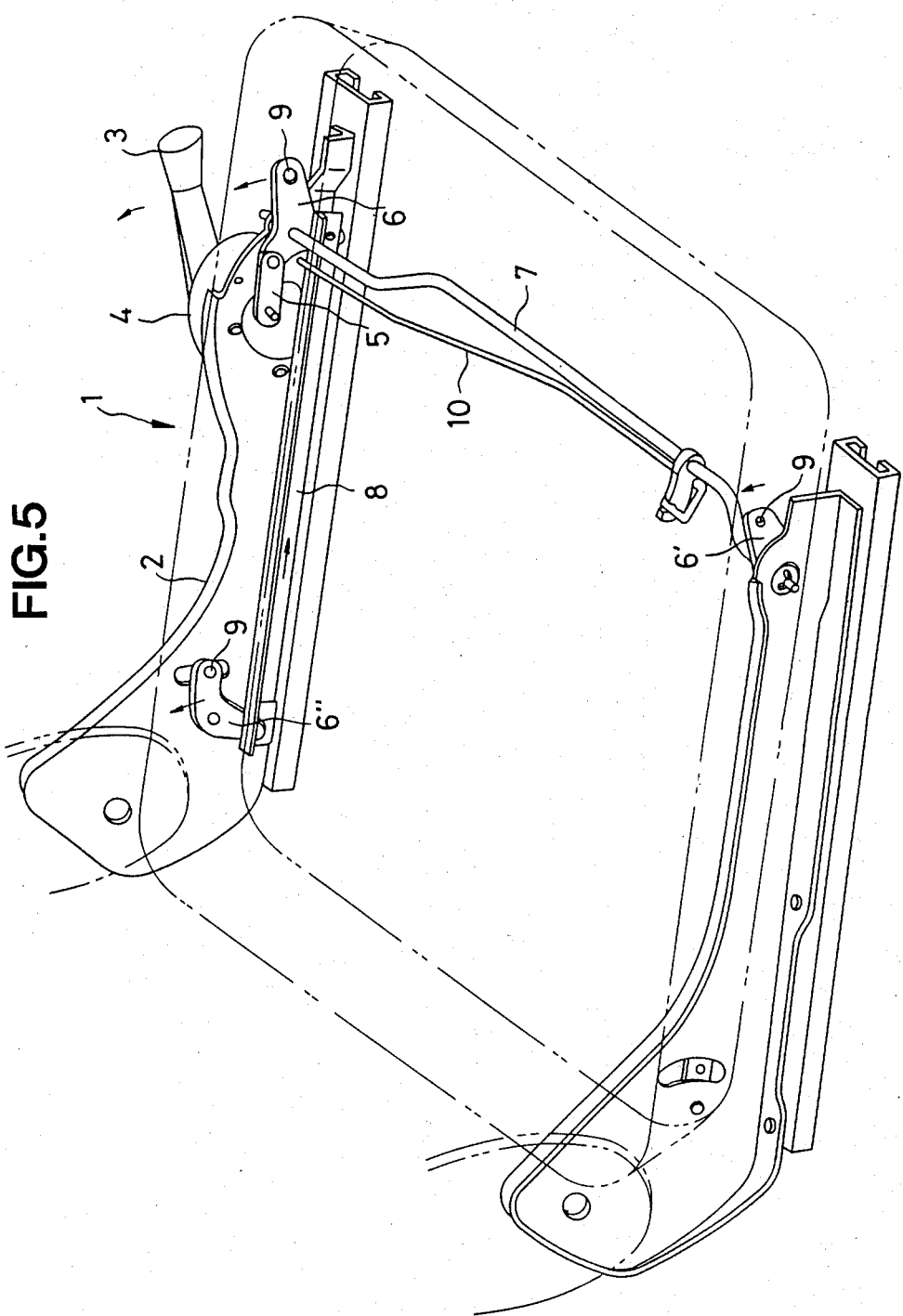

APPARATUS FOR ADJUSTING HEIGHT OF SEAT FOR AUTOMOBILE

BACKGROUND OF THE INVENTION

The present invention relates to an apparatus for adjusting the height of a seat for an automobile.

Referring first to FIG. 5, a typical conventional apparatus 1 for adjusting the height of a seat for an automobile basically has a handle 3 provided on a seat adjuster 2, a spring coupler 4 having a driving member operatively connected to the handle 3, a link 6 operatively connected to a driven member of the spring coupler 4 through a plate 5, and a rod 7 for connecting the link 6 mounted on one side of the seat and a link 6' on the other side. The reference numeral 8 denotes a bar for connecting together the link 6 and a link 6" disposed on the side of the apparatus 1 which is closer to the rear end of the vehicle. A seat frame is rigidly secured to the links 6, 6' and 6" using bores 9 respectively provided in these links.

Turning of the handle 3 in the direction of the arrow causes the link 6 to pivot in the same direction through the spring coupler 4, together with the other links 6' and 6", thus raising the seat. Since this seat raising operation is effected against the weights of the seat and an occupant seated therein, a relatively larger force is needed. The force required for actuating the handle 3 may be reduced by increasing the ratio of the distance between the center of pivotal motion of the handle 3 and the axis of the rod 6 to the length of the handle 3 and further employing a torsion spring 10 connected at one end thereof to the seat adjuster 2 and at the other end thereof to the link rod 7. The torsion spring 10 biases the link rod 7 in the direction in which the seat is raised.

Since the torsion spring 10 has a relatively high spring constant, the torque which acts about the link rod 7 shows a large gradient between the upper and lower positions of the seat, which means that it is impossible for this torsion spring 10 to be constantly balanced within a seat height adjustable range balance with the weights of the seat and an occupant seated.

SUMMARY OF THE INVENTION

In view of the above-mentioned circumstances, it is a primary object of the present invention to provide an apparatus for adjusting the height of a seat for an automobile which is so designed that it is able to be constantly balanced with the weights of the seat and an occupant seated therein within the seat height adjustable range without employing a torsion spring.

To this end, according to the present invention, a balance spring is incorporated in the above-described spring coupler, one end of the spring being retained by the casing of the coupler, and the other end of the spring being retained by the driven member of the coupler.

The balance spring is provided in such a manner that, when the seat is raised, the spring is allowed to unwind, whereas, when the seat is lowered, the spring is forced to be rewound. Thus, when the seat is raised, the balance spring helps raising of the seat. A spiral spring may be employed as the balance spring. The spiral spring is suitable for allowing the apparatus to balance with the seat within the seat height adjustable range, thus eliminating the disadvantages of the prior art.

The above and other objects, features and advantages of the present invention will become clear from the following description of the preferred embodiment thereof, taken in conjunction with the accompanying drawings.

BRIEF DESCRIPTION OF THE DRAWINGS

FIG. 5 is a perspective view of a prior art.

DESCRIPTION OF THE PREFERRED EMBODIMENT

Figure 1:
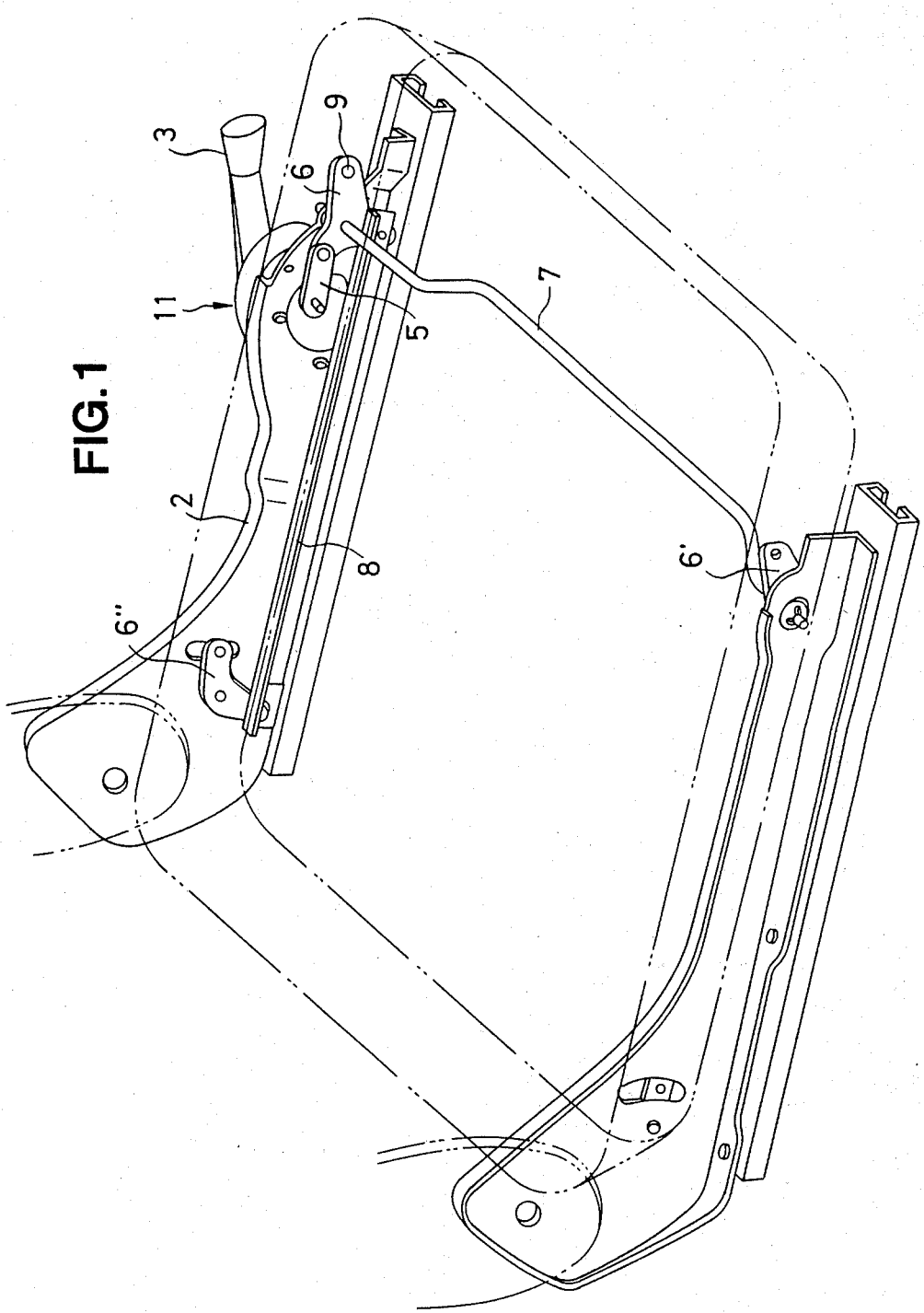
FIG. 1 is a perspective view of one embodiment of the present invention.

Referring to FIGS. 1 to 4, which show in combination one embodiment of the present invention, the same members or portions as those in the prior art shown in FIG. 5 are denoted by the same reference numerals, and description thereof is omitted.

Figure 2:
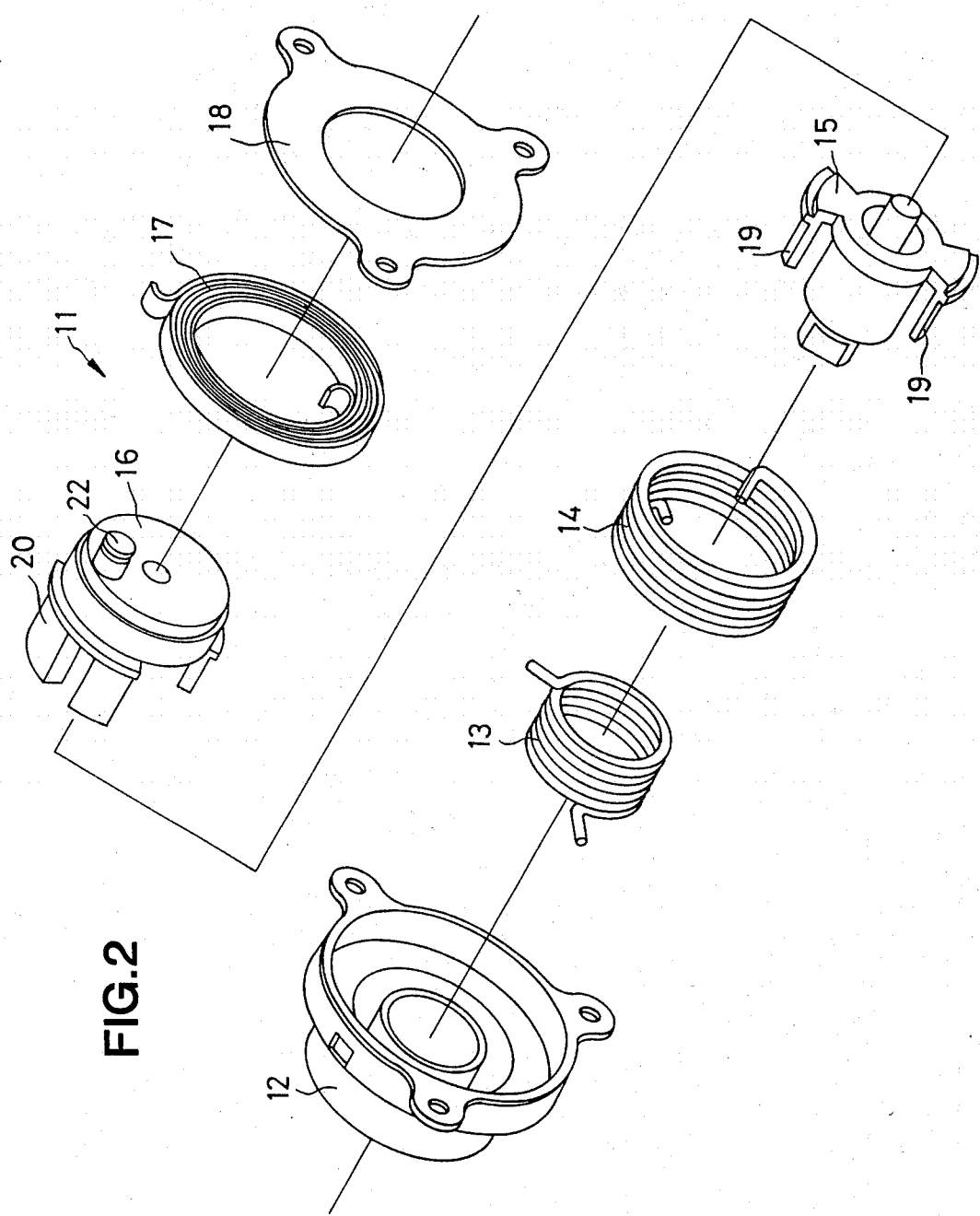
FIG. 2 is an exploded perspective view of a spring coupler employed in the embodiment.

As shown in FIG. 2, a spring coupler means 11 which is employed in the embodiment of the present invention consists of a casing 12, first and second torsion springs 13, 14, a driving member 15, a driven member 16, a balance spring or spiral spring 17, and a cover 18. The driving member 15 is rigidly secured to the handle 3 and has a pair of cores 19. The driven member 16 has plates 20 which extend along the same circumference as the cores 19.

Figure 3:
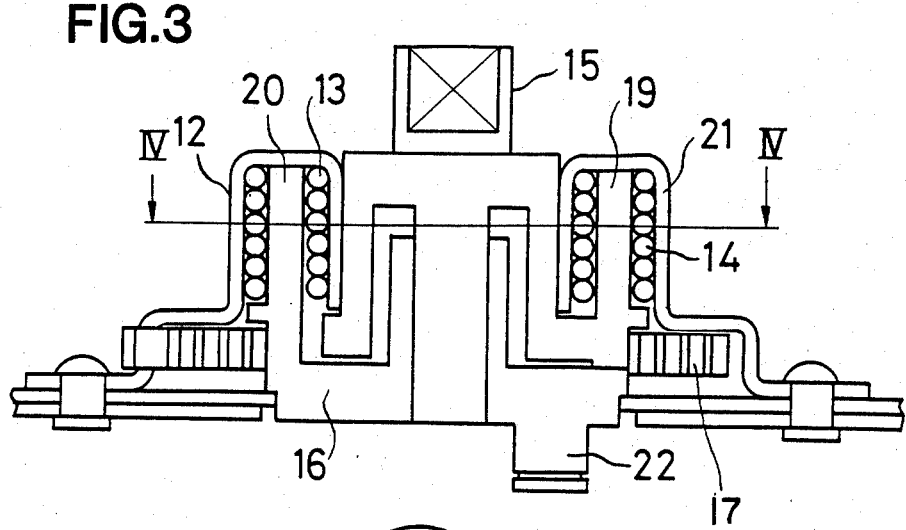
FIG. 3 is a sectional view of the spring coupler.
Figure 4:
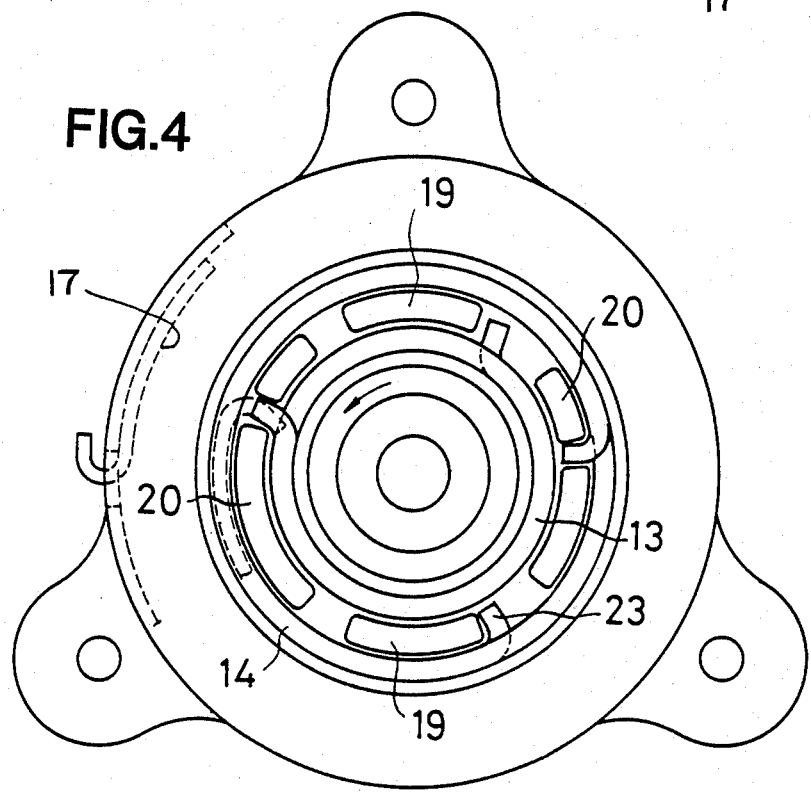
FIG. 4 is a sectional view taken along the line IV—IV of FIG. 3.

The above-described constituent members of the spring coupler 11 are assembled in the manner shown in FIGS. 3 and 4. More specifically, the cores 19 and the plates 20 are positioned on the same circumference and disposed in an annular cylindrical portion 21 defined in the casing 12. The first spring 13 is in contact with the inner wall of the cylindrical portion 21. One end of the spring 13 is inserted into the area defined between one core 19 and one plate 20, and the other end of the spring 13 is inserted into a notch provided in the other plate 20. The second spring 14 is disposed in the area defined between the cores 19 and the plates 20 on one hand and the outer wall of the cylindrical portion 21 on the other. One end of the spring 14 is inserted into the area defined between the other core 19 and the first-mentioned plate 20, and the other end of the spring 14 is inserted in a notch provided in the first-mentioned plate 20. One end of the spiral spring 17 is retained by the casing 12, and the other end of the spring 17 is retained by the driven member 16. An eccentric pin 22 which is porvided on the driven member 16 is pivotally connected to the plate 5 which, in turn, is connected to the link 6.

When the handle 3 is turned so as to rotate the driving member 15 in the direction of the arrow shown in FIG. 4, one core 19 comes in contact with the end portion 23 of the second spring 14, thereby releasing the spring 14 from the frictional contact with the outer circular housing of the cylindrical portion 21. In addition, the other core 19 comes in contact with one plate 20, thereby releasing the spring 13 from the frictional contact with the inner circular support frame of the cylindrical portion 21 while turning the driven member 16. At this time, the motion of the driven member 16 is accelerated by the action of the spiral spring 17, so that the handle actuating force is doubled when transmitted to the link 6, thus facilitating the raising of the seat. The turning of the handle 3 in the reverse direction causes the seat to be lowered. During this seat lowering operation, the spiral spring 17 is rewound while producing resistance, so that there is no fear of the seat being suddenly lowered. In addition, since the load which acts on the seat causes the first and second springs 13 and 14 to be brought into firm contact with the cylindrical portion 21, no load is transmitted to the driving member 16.

As has been described above, in the present invention the balance spring is disposed about the axis of the shaft of the handle. There is therefore no clearance at any of the joints of the links and the like which are connected to the spring coupler, and the links and the like move smoothly. The incorporation of the balance spring in the spring coupler simplifies the seat structure as compared with a conventional one employing a torsion spring, and facilitates the assembly.

Although the present invention has been described through specific terms, it should be noted here that the present invention is not necessarily limited to the described embodiment, and various changes and modifications may be imparted thereto without departing from the scope of the invention which is limited solely by the appended claims.

What is claimed is:

1. An apparatus for adjusting the height of a vehicle seat comprising:
   a handle;
   spring coupler means operatively connected to said handle and including a casing, said spring coupler means also including a drive member and a driven member rotatably mounted within said casing, said spring coupler means including two coil springs operatively connected to said drive member and said driven member;
   a link operatively connected to said handle through said spring coupler means;
   rod means connected to said link for supporting the vehicle seat; and
   a balance spring disposed within said casing for accelerating rotation of said driven member in a first direction and for braking rotation of said driven member in a second direction, one end of said spring being attached to said casing, and the other end of said spring being engageable with said driven member.

2. The apparatus according to claim 1, wherein said two coil springs are coaxially mounted, one of said coil springs having a relatively large diameter and the remaining coil spring having a relatively small diameter.

3. The apparatus according to claim 2, wherein said driven member of said spring coupler is formed in a cylindrical shape and includes a flange provided on the outer periphery thereof, said coil springs being windingly disposed on one side of said flange, and said balance spring being windingly disposed on the other side of said flange.

4. The apparatus according to claim 2, wherein said casing includes inner and outer cylindrical walls, said smaller-diameter coil spring being in frictional contact with said inner cylindrical wall, and said larger-diameter coil spring being in frictional contact with said outer cylindrical wall.

5. The apparatus according to claim 4, wherein a driving member is pivotally supported along said inner cylindrical wall of said casing.

6. The apparatus according to claim 3, wherein said outer cylindrical wall of said casing includes an annular step, said balance spring being disposed within said annular step.

7. A spring coupler apparatus comprising:
   a case having a circular housing extending a predetermined length measured along the axis of said housing, a circular support frame positioned radially inward from said housing and extending along a substantial portion of said predetermined length of said housing, said housing and said support frame concentrically aligned along a plane extending perpendicular to the axis of said housing, said case further including a sidewall connecting said housing and said support frame along said plane;
   drive means supported within said case along the length of said support frame, said drive means having a recess area;
   driven means disposed within said case and having a projection extending into said recess area for rotational alignment with said drive means;
   a first coil spring of relatively large diameter mounted between said housing and said support frame and having frictional engagement with said housing in the free state of the first spring, one end of said first spring being engageable with said driven means and the other end of said first spring being engageable with said drive means for contracting said first spring and freeing its frictional engagement with said housing in a first direction of rotation of said drive means;
   a second coil spring of relatively small diameter mounted between said housing and said support frame and having frictional engagement with said support frame in the free state of said second spring, one end of the said second spring being engageable with said driven means and the other end of said second spring being engageable with said drive means for expanding said second spring and freeing its frictional engagement with said support frame in a second direction of rotation of said drive means; and
   a third spring disposed within said case for accelerating rotation of said driven means in said first direction and for braking rotation of said driven means in said second direction, one end of said third spring secured to said casing and the other end of said third spring being engageable with said driven means.

8. The spring coupler defined in claim 7, wherein said circular housing includes a step portion, said third spring being disposed within said step portion.

9. The spring coupler defined in claim 7, wherein said driven means includes an eccentric pin and wherein the spring coupler also includes a link pivotally mounted on said eccentric pin.

10. The spring coupler defined in claim 9, wherein said third spring is a spiral member, said spiral member being unwound when said drive means is rotated in said first direction to increase an actuating force applied by said driven means to said link, said spiral member being rewound when said drive means is rotated in said second direction to resist a load force applied by said link to said driven means.

11. A spring coupler for adjusting the height of a vehicle seat, comprising:
    a handle;
    spring coupler means operatively connected to said handle, said spring coupler means including a casing, a drive member secured to said handle, a driven member mounted within said casing for rotation by said drive means, and first and second coil springs normally frictionally engaged to said casing, thereby disengaging said first and second coil springs from said casing to allow rotation of said drive member in either direction, while preventing essentially any movement of said drive member by initial rotation of said driven member;

a link operatively connected to said handle through said spring coupler means;

rod means connected to said link for supporting the vehicle seat; and a balance spring disposed within said casing, one end of said balance spring being attached to said casing and the other end of said balance spring being engageable with said driven member, wherein said balance spring accelerates rotation of said driven means in a first direction and brakes rotation of said driven means in a second direction.

* * * * *